(12) United States Patent
Segal et al.

(10) Patent No.: US 6,820,804 B2
(45) Date of Patent: Nov. 23, 2004

(54) METHOD AND SYSTEM FOR PERFORMING A PURCHASE TRANSACTION USING A REMOTE CONTROL AND A TELEVISION

(75) Inventors: Jack A. Segal, Oxnard, CA (US); Steven B. Branton, Ventura, CA (US); William Allen Yates, Camarillo, CA (US)

(73) Assignee: Interlink Electronics, Inc., Camarillo, CA (US)

( * ) Notice: Subject to any disclaimer, the term of this patent is extended or adjusted under 35 U.S.C. 154(b) by 199 days.

(21) Appl. No.: 09/730,950

(22) Filed: Dec. 5, 2000

(65) Prior Publication Data

US 2002/0066784 A1 Jun. 6, 2002

(51) Int. Cl.$^7$ ................................................. G06F 7/08
(52) U.S. Cl. ...................... 235/381; 235/379; 235/380; 725/19; 902/40
(58) Field of Search ................................ 235/379–381; 725/5–6, 19; 902/40

(56) References Cited

U.S. PATENT DOCUMENTS

| | | |
|---|---|---|
| 4,101,959 A | 7/1978 | Domike et al. |
| 4,723,794 A | 2/1988 | Shannon |
| 4,981,370 A | 1/1991 | Dziewit et al. |
| 5,031,214 A | 7/1991 | Dziewit et al. |
| 5,046,093 A | 9/1991 | Wachob |
| 5,091,975 A | 2/1992 | Berger et al. |
| 5,163,091 A | 11/1992 | Graziano et al. |
| 5,191,613 A | 3/1993 | Graziano et al. |
| 5,210,611 A * | 5/1993 | Yee et al. .................... 348/473 |
| 5,297,202 A | 3/1994 | Kapp et al. |
| 5,361,091 A * | 11/1994 | Hoarty et al. ................ 725/119 |
| 5,428,210 A | 6/1995 | Nair et al. |
| 5,432,326 A | 7/1995 | Noblett, Jr. et al. |
| 5,559,895 A | 9/1996 | Lee et al. |

(List continued on next page.)

FOREIGN PATENT DOCUMENTS

| | | |
|---|---|---|
| WO | WO 98/00968 | 6/1997 |
| WO | WO 00/16252 | 9/1999 |

*Primary Examiner*—Michael G. Lee
*Assistant Examiner*—Seung H Lee
(74) *Attorney, Agent, or Firm*—Brooks Kushman P.C.

(57) ABSTRACT

A method and system for performing purchase transactions such as credit and charge card transactions includes a home entertainment (HE) device having a display screen. A signature capturing sensor such as a remote control having a touch pad is operable for generating touch pad signals as a function of being touched by a consumer. A controller is operable with the HE device for controlling the HE device to display on the display screen purchase transaction form such as a credit card slip having a signature entry area. The controller is further operable with the HE device and the touch pad for controlling the HE device to display on the display screen a signature of the consumer in the signature entry area of the credit card slip in response to touch pad signals being generated by the touch pad as the consumer touches the touch pad and enters the signature on the touch pad. The controller uses the credit card slip and the entered signature displayed on the display screen to effect a credit card transaction. The controller may transmit information indicative of the credit card slip and the entered signature to the transaction database in order to make a record of the credit card transaction to be effected.

7 Claims, 2 Drawing Sheets

U.S. PATENT DOCUMENTS

| | | | |
|---|---|---|---|
| 5,561,282 A | | 10/1996 | Price et al. |
| 5,590,038 A | * | 12/1996 | Pitroda .................. 705/41 |
| 5,603,078 A | | 2/1997 | Henderson et al. |
| 5,604,802 A | | 2/1997 | Holloway |
| 5,647,017 A | * | 7/1997 | Smithies et al. ............ 382/119 |
| 5,679,943 A | | 10/1997 | Schultz et al. |
| 5,740,246 A | | 4/1998 | Saito |
| 5,764,179 A | * | 6/1998 | Tsurumoto ................ 341/176 |
| 5,815,657 A | | 9/1998 | Williams et al. |
| 5,818,425 A | * | 10/1998 | Want et al. ................ 345/158 |
| 5,884,271 A | | 3/1999 | Pitroda |
| 5,889,506 A | * | 3/1999 | Lopresti et al. ............. 345/158 |
| 5,930,380 A | * | 7/1999 | Kashi et al. ................ 382/119 |
| 5,956,025 A | * | 9/1999 | Goulden et al. ............ 345/716 |
| 6,019,393 A | * | 2/2000 | Loebner ................... 283/60.2 |
| 6,032,137 A | | 2/2000 | Ballard |
| 6,049,785 A | | 4/2000 | Gifford |
| 6,069,672 A | * | 5/2000 | Claassen .................... 348/734 |
| 6,193,152 B1 | * | 2/2001 | Fernando et al. .......... 235/380 |
| 6,275,991 B1 | * | 8/2001 | Erlin ......................... 725/141 |
| 6,405,369 B1 | * | 6/2002 | Tsuria .......................... 725/6 |
| 6,430,305 B1 | * | 8/2002 | Decker ....................... 382/116 |

\* cited by examiner

METHOD AND SYSTEM FOR PERFORMING A PURCHASE TRANSACTION USING A REMOTE CONTROL AND A TELEVISION

TECHNICAL FIELD

The present invention generally relates to methods and systems for performing purchase transactions and, more particularly, to a method and system for performing a purchase transaction using a home entertainment (HE) device and a signature capturing sensor.

BACKGROUND ART

Purchase transactions such as credit and charge card transactions are conducted between consumers and merchants to effect the sale of goods and services from the merchants to the consumers. Traditionally, the point of sale of a credit (or charge) card transaction is the merchant's business with the consumer and the merchant being in each other's presence. The merchant provides the goods or services to the consumer and the consumer provides the merchant with a credit card for payment. The merchant then uses the credit card number to debit the credit card account of the consumer. The consumer signs a receipt evidencing the transaction. The merchant keeps the original signed receipt and gives the consumer a copy of the signed receipt. The signed receipts are evidence of proof of purchase for both the consumer and the merchant.

Credit card transactions now routinely take place with consumers and merchants being located in different places during a sales transaction. These types of transactions routinely take place over telephone communication systems, data communication systems such as the Internet, and mail order environments. As an example, in a transaction conducted over a telephone the consumer talks with a representative of the merchant to place an order. The consumer then gives the merchant credit card information and the merchant debits the credit card account of the consumer. A problem with this scenario is that proof of the conversation over the telephone is not as strong evidence as a signed receipt and many times, it is easier for an unauthorized person to act on behalf of the consumer and purchase goods or services.

With the advent of broadband and cable technology, television is now being used to provide another avenue for transactions to be conducted between consumers and merchants. Some television channels are devoted to advertising goods and services for sale to consumers. In response to seeing an item of interest on such a television channel, consumers call the representative of the merchant over the telephone and place an order for the item. Such transactions suffer from the disadvantages associated with typical transactions conducted over the telephone as described above.

With interactive television the consumer may place an order for the item through the television via the cable network without using the telephone. Typically, in this case, the television displays a graphical user interface (GUI) listing items. The consumer selects an item in the GUI by pressing a select button on a remote control operable for controlling the television. However, like the telephone transactions described above, interactive television transactions are not evidenced by signed receipts and unauthorized users may use the remote control to make purchases.

SUMMARY OF THE INVENTION

Accordingly, it is an object of the present invention to provide a method and system for performing a purchase transaction such as a credit (or charge) card transaction using a home entertainment (HE) device and a signature capturing sensor.

It is another object of the present invention to provide a method and system for performing a performing a credit card transaction using a HE device and a remote control having signature capturing capability for entering a signature in a credit card receipt displayed on the HE device.

It is a further object of the present invention to provide a method and system for performing a credit card transaction using a HE device and a remote control having a touch pad for allowing a consumer to sign the touch pad and enter the signature in a credit card receipt displayed on the HE device.

It is still another object of the present invention to provide a method and system for performing a credit card transaction using a HE device and a remote control having signature capturing capability in which a captured signature is bundled with transaction data displayed on the HE device to effect the credit card transaction.

It is still a further object of the present invention to provide a method and system for performing a credit card transaction using a HE device and a remote control having signature capturing capability in which a captured signature is bundled with transaction data displayed on the HE device and transmitted directly to a merchant bypassing the HE device to effect the credit card transaction.

It is still yet another object of the present invention to provide a method and system for performing a credit card transaction using a HE device and a remote control having signature capturing capability in which a captured signature is bundled with transaction data displayed on a HE device and transmitted via the HE device to a merchant to effect the credit card transaction.

It is still yet a further object of the present invention to provide a method and system for performing a credit card transaction using a HE device and a remote control having signature capturing capability in which a captured signature is bundled with transaction data displayed on the HE device and stored in a database to effect proof of the credit card transaction.

In carrying out the above objects and other objects, the present invention provides a system for performing purchase transactions such as credit (and charge) card transactions. The system includes a home entertainment (HE) device having a display screen. A signature capturing sensor such as a touch pad is operable for generating touch pad signals as a function of being touched by a consumer. A controller is operable with the HE device for controlling the HE device to display on the display screen a purchase transaction form such as a credit card slip having a signature entry area. The controller is further operable with the HE device and the touch pad for controlling the HE device to display on the display screen a signature of the consumer in the signature entry area of the credit card slip in response to touch pad signals being generated by the touch pad as the consumer touches the touch pad and enters the signature on the touch pad. The controller uses the credit card slip and the entered signature displayed on the display screen to effect a credit card transaction.

The system may further include a transaction database. The controller transmits information indicative of the credit card slip and the entered signature to the transaction database in order to make a record of the credit card transaction to be effected.

The touch pad may be pressure sensitive and generates the touch pad signals as a function of pressure applied by the consumer while being touched by the consumer. The controller controls the HE device to display on the display screen the signature of the consumer in the signature entry area of the credit card slip as a function of pressure applied by the consumer while touching the touch pad in response to touch pad signals being generated by the touch pad as the consumer touches the touch pad and enters the signature on the touch pad. The controller may also transmit information indicative of the credit card slip and information indicative of the entered signature including pressure information to the transaction database in order to make a record of the credit card transaction to be effected and proof of signature.

In carrying out the above objects and other objects, the present invention further provides a method for performing purchase transactions such as credit (and charge) card transactions using a home entertainment (HE) device having a display screen and a signature capturing sensor such as a touch pad. The method includes controlling the HE device to display on the display screen a purchase transaction form such as a credit card slip having a signature entry area. Touch pad signals are then generated as a function of the touch pad being touched by a consumer. The HE device is then controlled to display on the display screen a signature of the consumer in the signature entry area in response to touch pad signals being generated by the touch pad as the consumer touches the touch pad and enters the signature on the touch pad. The credit card slip and the entered signature displayed on the display screen are then used to effect a credit card transaction. The method may further include transmitting information indicative of the credit card slip and the entered signature to a transaction database in order to make a record of the credit card transaction to be effected.

Further, in carrying out the above objects and other objects, the present invention provides a system for performing purchase transactions such as credit (and charge) card transactions. The system includes a home entertainment (HE) device having a purchase transaction form such as a credit card slip displayed on a display screen. The system further includes a signature capturing sensor such as a touch pad mapped to the credit card slip as a function of the ratio of the areas of the touch pad and the credit card slip such that each location of the touch pad corresponds to a respective location of the credit card slip. A controller is operable with the HE device and the remote control to enable a control function associated with a location of the credit card slip in response to the corresponding location of the touch pad being touched in order to effect a credit card transaction.

Further, in carrying out the above objects and other objects, the present invention provides a system for performing purchase transactions such as credit (and charge) card transactions. The system includes a television displaying a purchase transaction form such as a credit card slip. The system further includes a signature capturing sensor such as a remote control having a touch pad operable for generating touch pad signals as a function of being touched by a consumer. A controller is operable with the television and the touch pad for controlling the television to display a signature of the consumer on the credit card slip in response to touch pad signals being generated by the touch pad as the consumer touches the touch pad and enters the signature on the touch pad.

Further, in carrying out the above objects and other objects, the present invention provides a method for performing purchasing transactions such as credit (and charge) card transactions using a television and a remote control having a touch pad. The method includes displaying a purchase transaction form such as a credit card slip on the television and generating touch pad signals as a function of the touch pad being touched by a consumer. The television is then controlled to display a signature of the consumer in the credit card slip in response to touch pad signals being generated by the touch pad as the consumer touches the touch pad and enters the signature on the touch pad. The credit card slip and the entered signature displayed on the television is then used to effect a credit card transaction.

Further, in carrying out the above objects and other objects, the present invention provides a method for performing purchase transactions such as credit (and charge) card transactions using a television and a remote control having a touch pad. The method includes displaying purchase transaction form such as a credit card slip having a signature line on the television. The touch pad is mapped to the credit card slip as a function of the ratio of the areas of the touch pad and the credit card slip such that each location of the touch pad corresponds to a respective location of the credit card slip. Touch pad signals are then generated as a function of the touch pad being touched by a consumer. The television is then controlled to display a signature of the consumer in the credit card slip in response to touch pad signals being generated by the touch pad as the consumer touches the location of the touch pad corresponding to the signature line and enters the signature on the touch pad. The credit card slip and the entered signature displayed on the television are then used to effect a credit card transaction.

These and other features, aspects, and embodiments of the present invention will become better understood with regard to the following description, appended claims, and accompanying drawings.

BEST MODES FOR CARRYING OUT THE INVENTION

Figure 1:
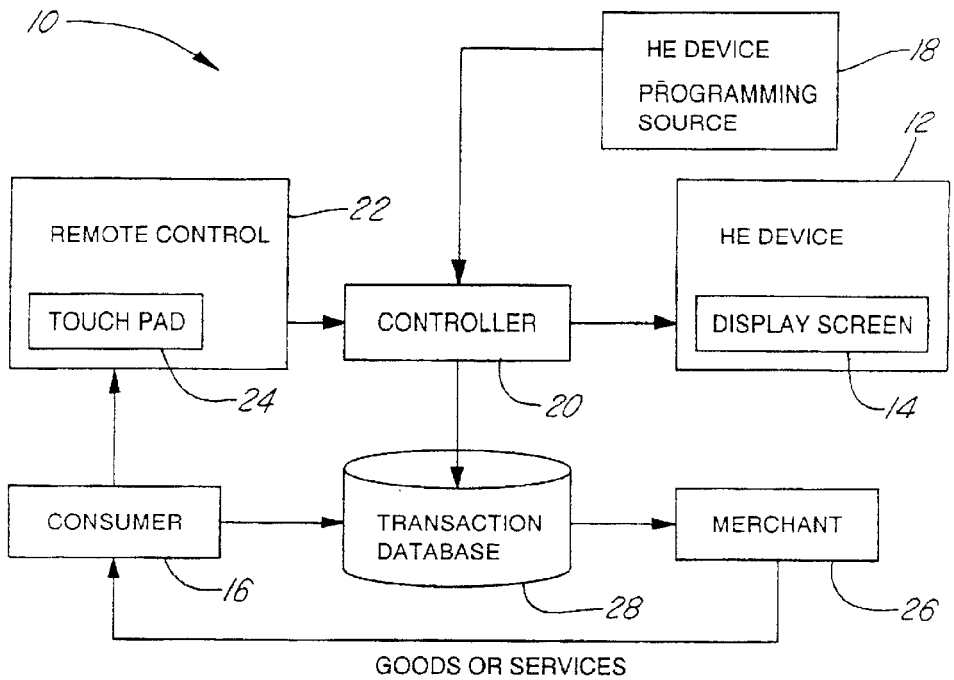
FIG. 1 illustrates a block diagram of a system for performing purchasing transactions such as credit card transactions in accordance with the present invention.

Referring now to FIG. 1, a block diagram of a system 10 for performing purchase transactions such as credit and charge card transactions in accordance with the present invention is shown. System 10 includes a home entertainment (HE) device 12 such as a television, computer, network appliance, etc., having a display screen 14. In general, HE device 12 is a data communications appliance such as a web appliance having a display screen for displaying video images. HE device 12 may be located in the home or business of consumer 16 and is generally in the environment of the consumer. A HE device programming source 18 is connected to a controller 20 by a telecommunications network such as cable and satellite networks. HE device programming source 18 provides programming signals including cable signals, satellite signals, wireless signals, Internet signals, and the like to HE device 12 via controller 20. Controller 20 may be a set top box or the like. Controller 20 may be a part of HE device 12 or may be remote of the HE device. Controller 20 enables HE device 12 to receive the desired available programming signals from HE device programming source 18. Display screen 14 displays video signals associated with the received programming signals.

Consumer 16 uses a remote control 22 to control HE device 12. Remote control 22 generates remote control signals in response to operation by consumer 16. Remote control 22 transmits the remote control signals to controller 20. Controller 20 controls HE device 12 in accordance with the remote control signals. For example, the remote control signal may be indicative of changing a channel on HE device 12 and controller 20 would control the HE device to change the channel. The remote control signal may be indicative of lowering the volume of HE device 12 and controller 20 would control the HE device to lower the volume. It should be noted that remote control 22 may be connected wirelessly or by wire to controller 20. Similarly, controller 20 may be connected wirelessly or wired to HE device 12. Remote control 22 may be in the form of a typical remote control, a keyboard, integrated with controller 20 or HE device 12, and the like.

Remote control 22 further includes a signature capturing sensor such as a touch pad or touch screen 24. Touch pad 24 includes a touch pad surface area for consumer 16 to touch. Consumer 16 touches touch pad 24 with either a finger or a stylus. In response to being touched by consumer 16, touch pad 24 generates touch pad signals. The touch pad signals may be defined to be remote control signals that are generated in response to touch pad 24 being touched. The touch pad signals may be indicative of the location of touch pad 24 being touched and the pressure applied at the location. Remote control 22 transmits the touch pad signals to controller 20. Controller 20 controls HE device 12 in accordance with the touch pad signals. In general, the touch pad signals are used to navigate and interact with images displayed on display screen 14.

Figure 2:
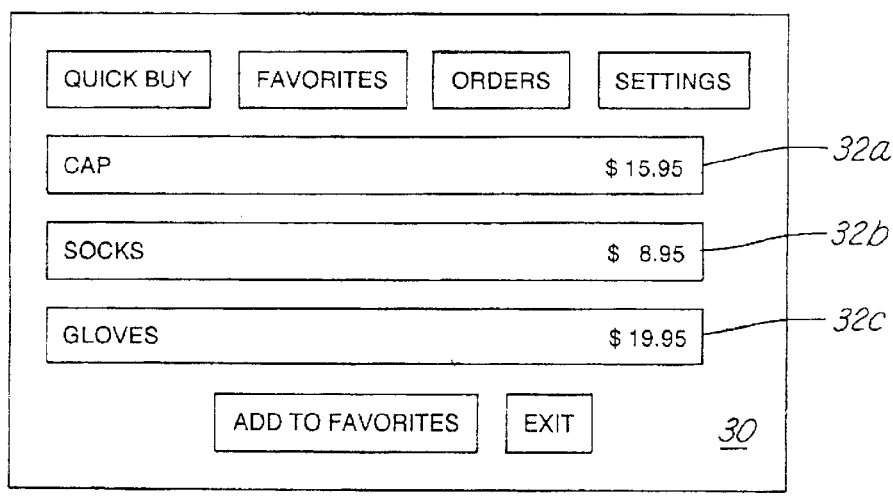
FIG. 2 illustrates a graphical user interface (GUI) listing items for sale from a merchant and displayed on the display screen of the home entertainment (HE) device shown in FIG. 1.
Figure 3:
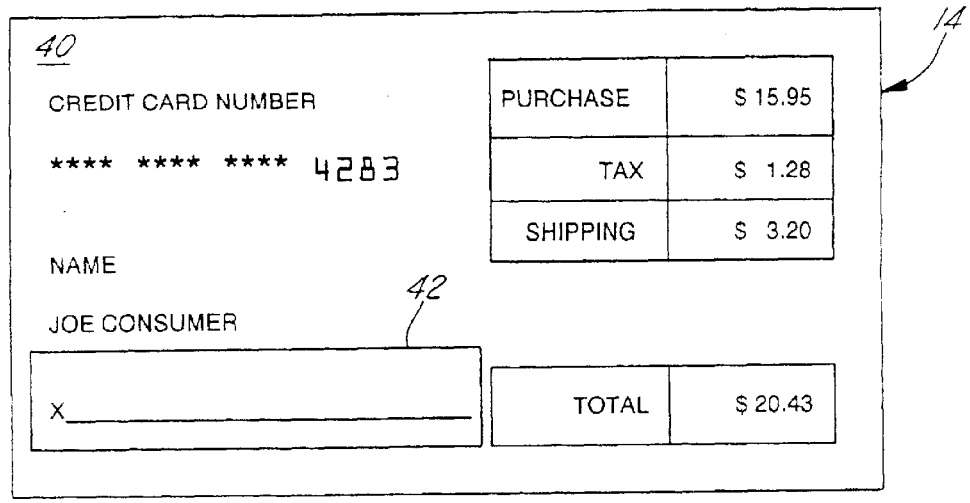
FIG. 3 illustrates a GUI representative of a credit card slip and displayed on the display screen of the HE device shown in FIG. 1.

Referring now to FIGS. 2 and 3, with continual reference to FIG. 1, the operation of consumer 16 using a signature capturing device such as remote control 22 to conduct a credit card transaction using HE device 12 will be described. Consumer 16 operates remote control 22 to generate remote control signals requesting HE device 12 to display a graphical user interface (GUI) 30 on display screen 14 listing items for sale from a merchant 26. GUI 30 is shown in FIG. 2 and includes an exemplary list of three items: cap 32a, socks 32b, and gloves 32c. Consumer 16 then operates remote control 22 to generate remote control signals to select an item in GUI 30 displayed on display screen 14 for purchase from merchant 26. For instance, consumer 16 selects cap item 32a. It is noted that in addition to GUI 30, the images displayed by display screen 14 may include electronic program guides (EPG), catalog GUIs, programming GUIs, and the like for describing goods or services that consumer 16 may purchase from merchant 26.

Controller 20 then controls HE device 12 to display a purchase transaction form such as credit card slip 40 as shown in FIG. 3 on display screen 14. Credit card slip 40 is a GUI that resembles typical credit card slips. Credit card slip 40 contains transaction data indicative of the cap item 32a to be purchased by consumer 26, the name of the consumer, the credit card number of the consumer, a personal identification number associated with the consumer, and the like. The transaction data such as the credit card number may be entered into credit card slip 40 by consumer 16. Consumer 16 uses remote control 22 and touch pad 24 to generate remote control signals indicative of such information. Remote control 22 may also include a credit card reader, a smart card reader, or other reading device capable of capturing the consumer's identification information, credit information, and other purchase related information. Credit card slip 40 further includes transaction data including a total money amount to be debited from the credit card account of consumer 16 in order to effect the transfer of money from the consumer to merchant 26 for the selected item. Credit card slip 40 also includes a signature entry area or box 42.

Consumer 16 operates touch pad 24 to sign the touch pad and enter a signature into the touch pad. Touch pad 24 generates touch pad signals indicative of the entered signature and remote control 22 transmits the touch pad signals to controller 20. Controller 20 then controls display screen 14 of HE device 12 to enter the signature into signature entry 42 of credit card slip 40.

After consumer 16 signs credit card slip 40 displayed on display screen 14 by entering a signature on touch pad 24 to accept the credit card transaction controller 20 bundles the signature entered into touch pad 24 with the transaction data associated with the credit card slip. Controller 20 then transmits the signature and the credit card slip transaction data to a transaction database 28. Transaction database 28 stores the signature and the credit card transaction data to provide proof of the credit card transaction. Transaction database 28 may generate a hard copy or electronic copy of the signature and the credit card transaction data to evidence the credit card transaction. Merchant 26 receives information about the credit card transaction from transaction database 28 and then transfers the selected item to consumer 16 to fulfill the credit card transaction. Merchant 26 subsequently receives payment for the selected item from the credit card provider.

Controller 20 may transmit the signature and the credit card slip transaction data to transaction database 28 using wireless communications. Transaction database 28 may also be a part of HE device programming source 18 and, in this case, controller 20 transmit the signature and the credit card slip transaction data through the cable, satellite, or other network to the HE device programming source.

Touch pad 24 is operable with display screen 14 such that the area of the touch pad is absolutely mapped to the area of the display screen. This means that each portion of touch pad 12 corresponds to a respective portion of the graphical user interfaces displayed on display screen 14. For instance, the upper portion of touch pad 24 corresponds to item 32a in GUI 30; the middle portion of the touch pad corresponds to item 32b in GUI 30; and the lower portion of the touch pad corresponds to item 32c in GUI 30. Similarly, the lower left portion of touch pad 24 corresponds to signature entry box 42 in credit card slip 40. Because the area of touch pad 24 is mapped to display screen 14 consumer 16 can manipulate touch pad 24 to select entries of the panels and menus displayed on the display screen and enter a signature while remaining visually focused on the display screen.

Figure 4:
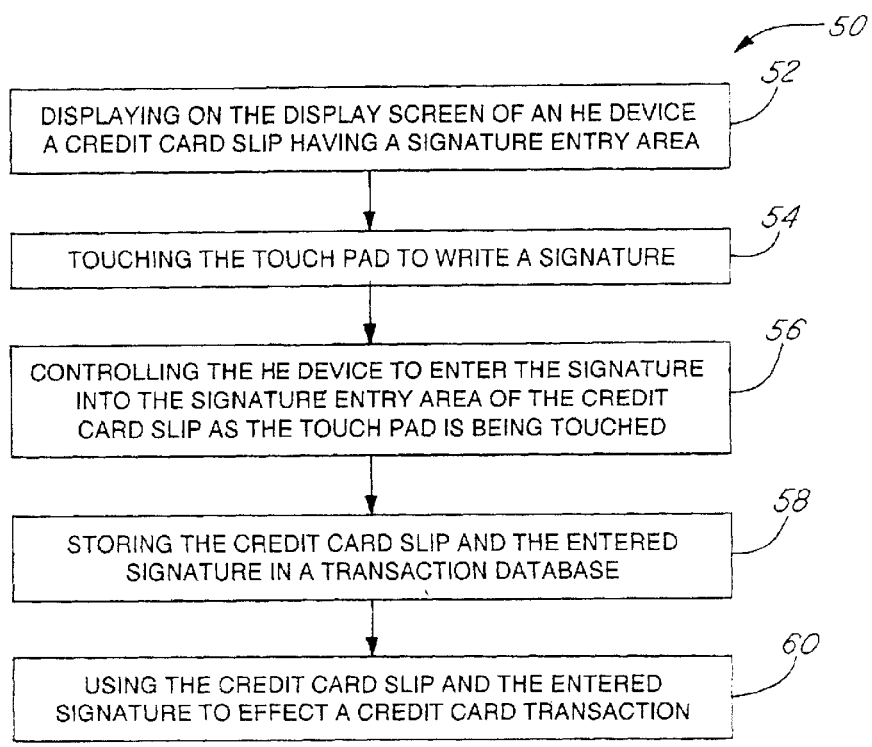
FIG. 4 illustrates a flow chart describing operation of the method and system of the present invention.

Referring now to FIG. 4, a flow chart 50 describing operation of the method and system of the present invention is shown. Flowchart 50 begins with displaying on display screen 14 of HE device 12 a credit card slip 40 having a signature entry area 42 as shown in block 52. Consumer 16 then touches touch pad 24 to write a signature as shown in block 54. Controller 20 then controls HE device 12 to enter the signature written on touch pad 24 into signature entry area 42 on display screen 14 as the touch pad is being touched by consumer 16 as shown in block 56. Controller 20 then transfers the signed credit card slip to transaction database 28. Transaction database 28 stores the signed credit card slip for later proof of the credit card transaction as shown in block 58. The signed credit card slip is then transferred to merchant 26 to effect the credit card transaction as shown in block 60. If needed, the signed credit card slip may be retrieved and distributed to aid in the settlement of a purchase dispute.

Thus it is apparent that there has been provided, in accordance with the present invention, a method and system for performing a purchase transaction using a home entertainment (HE) device and a signature capturing sensor such as a remote control having signature capturing capability that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for enabling a television viewer to perform purchase transactions, the system comprising:

a television having a display screen;

a remote control having a touch pad, the remote control being operable for generating remote control signals in response to operation by a television viewer, the touch pad being operable for generating signature signals as the television viewer touches the touch pad and writes the television viewer's signature on the touch pad, the signature signals being indicative of the television viewer's signature being written on the touch pad by the television viewer; and a controller operable with the television for controlling at least one of television channel and volume functions in response to receiving the remote control signals;

the controller being operable with the television for controlling the television to display on the display screen a purchase transaction form having a signature entry area in order to enable the television viewer to perform a purchase transaction via the television, the controller further operable with the television and the touch pad for controlling the television to display on the display screen the television viewer's signature in the signature entry area of the purchase transaction form in response to receiving signature signals being generated by the touch pad as the television viewer touches the touch pad and writes the television viewer's signature on the touch pad in order to authenticate the purchase transaction form with the television viewer's signature being written on the touch pad by the television viewer.

2. A remote control for controlling a television, the television being operable for displaying a credit card transaction receipt to enable a television viewer to perform a credit card transaction via the television, the remote control comprising:

a touch pad operable for generating touch pad signals as a television viewer touches the touch pad and writes the television viewer's signature on the touch pad, the touch pad signals being indicative of the television viewer's signature being written on the touch pad by the television viewer; and a transmitter for transmitting remote control signals to the television in response to operation of the remote control by the television viewer in order to control at least one of channel and volume television functions;

wherein the transmitter is operable with the touch pad for transmitting the touch pad signals to the television as the television viewer touches the touch pad and writes the television viewer's signature on the touch pad for the television to display the television viewer's signature within a credit card transaction receipt displayed by the television as the television viewer touches the touch pad and writes the television viewer's signature on the touch pad in order to authenticate the credit card transaction receipt with the television viewer's signature being written on the touch pad by the television viewer.

3. The remote control of claim 2 wherein:

the touch pad is mapped to a signature entry area of the credit card transaction receipt as a function of the ratio of the areas of the touch pad and the signature entry area such that each location of the touch pad corresponds to a respective location of the signature entry area;

wherein the television displays the television viewer's signature within the signature entry area of the credit card transaction receipt displayed by the television as the television viewer touches the touch pad and writes the television viewer's signature on the touch pad in order to authenticate the credit card transaction receipt with the television viewer's signature.

4. The remote control of claim 3 wherein:

the touch pad is pressure sensitive and generates the touch pad signals as a function of pressure applied by the television viewer while being touched by the television viewer, wherein the television the television viewer's signature within the credit card transaction receipt as a function of pressure applied by the television viewer on the touch pad while touching the touch pad and writing the television viewer's signature on the touch pad.

5. The system of claim 4 further comprising:

a transaction database, wherein the television transmits information indicative of the credit card transaction receipt and information indicative of the television viewer's signature including pressure information to the transaction database in order to make a record of a credit card transaction to be effected and proof of signature.

6. A method for controlling a television using a remote control having a touch pad, the television being operable for displaying a credit card transaction receipt to enable a television viewer to perform a credit card transaction via the television, the method comprising:

generating touch pad signals indicative of a television viewer's signature being written on the touch pad by the television viewer as the television viewer touches the touch pad of the remote control and writes the television viewer's signature on the touch pad by the television viewer;

transmitting remote control signals from the remote control to the television in response to operation of the remote control by the television viewer in order to control at least one of channel and volume television functions; and transmitting the touch pad signals from the remote control to the television as the television viewer touches the touch pad and writes the television viewer's signature on the touch pad for the television to display the television viewer's signature within a credit card transaction receipt displayed by the television as the television viewer touches the touch pad and writes the television viewer's signature on the touch pad in order to authenticate the credit card transaction receipt with the television viewer's signature being written on the touch pad.

7. A remote control for controlling a television, the television being operable for displaying a credit card transaction receipt to enable a television viewer to perform a credit card transaction via the television, the remote control comprising:

a touch pad operable for generating touch pad signals as a television viewer touches the touch pad and writes the television viewer's signature on the touch pad, the touch pad signals being indicative of the television viewer's signature being written on the touch pad by the television viewer, the touch pad being operable for generating remote control signals in response to operation by the television viewer in order to control at least one of television channel and volume functions; and a transmitter for transmitting the remote control signals to the television in response to operation of the touch pad by the television viewer;

the transmitter transmitting the touch pad signals to the television as the television viewer touches the touch pad and writes the television viewer's signature on the touch pad for the television to display the television viewer's signature within a credit card transaction receipt displayed by the television as the television viewer touches the touch pad and writes the television viewer's signature on the touch pad in order to authenticate the credit card transaction receipt with the television viewer's signature being written on the touch pad.

* * * * *